(12) United States Patent
Sims et al.

(10) Patent No.: US 10,115,392 B2
(45) Date of Patent: Oct. 30, 2018

(54) METHOD FOR ADJUSTING A VOICE RECOGNITION SYSTEM COMPRISING A SPEAKER AND A MICROPHONE, AND VOICE RECOGNITION SYSTEM

(75) Inventors: Michael J. Sims, Zeeland, MI (US); Brian L. Douthitt, Holland, MI (US); David J. Hughes, Jenison, MI (US); Mark Zeinstra, Holland, MI (US); Ted W. Ringold, Hudsonville, MI (US); Douglas W. Klamer, Holland, MI (US); Todd Witters, Jenison, MI (US); Elisabet A. Anderson, Holland, MI (US)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 146 days.

(21) Appl. No.: 12/793,113

(22) Filed: Jun. 3, 2010

(65) Prior Publication Data

US 2011/0301954 A1    Dec. 8, 2011

(51) Int. Cl.
*G10L 15/065* (2013.01)
*G10L 15/20* (2006.01)

(52) U.S. Cl.
CPC ............ *G10L 15/065* (2013.01); *G10L 15/20* (2013.01)

(58) Field of Classification Search
USPC ....... 704/246, 233, 234, 251, 254, 260, 275, 704/270, 257; 455/575.9, 569.2, 404.1; 381/86, 151, 96, 66, 92; 340/438, 990; 715/800, 863; 701/211, 1; 343/711; 342/357.75; 369/25.01
See application file for complete search history.

(56) References Cited

U.S. PATENT DOCUMENTS 5,155,689 A * 10/1992 Wortham ............... G01D 4/004
455/456.3
5,477,511 A * 12/1995 Englehardt .............. G11C 7/16
369/25.01

(Continued)

FOREIGN PATENT DOCUMENTS

FR    2906071     3/2008
JP    H01236000 A  9/1989

(Continued)

OTHER PUBLICATIONS

Japanese Examination Report dated Oct. 27, 2015 for Japanese Application No. 2013-513164.

(Continued)

*Primary Examiner* — Neeraj Sharma
(74) *Attorney, Agent, or Firm* — The Dobrusin Law Firm, P.C.

(57) ABSTRACT

A method for adjusting a voice recognition system and a voice recognition system is disclosed, wherein the voice recognition system comprises a speaker and a microphone, and wherein the method comprises the steps of:
- memorizing an audio frequency signal,
- playing back the audio frequency signal by means of the speaker,
- generating a detection signal by detecting the audio frequency signal by means of the microphone, and
- adjusting parameters of the voice recognition system dependent on the detection signal.

19 Claims, 3 Drawing Sheets

(56) References Cited

U.S. PATENT DOCUMENTS

| | | | | |
|---|---|---|---|---|
| 5,548,681 | A * | 8/1996 | Gleaves et al. | 704/233 |
| 5,774,858 | A * | 6/1998 | Taubkin | B60R 25/257 |
| | | | | 704/270 |
| 6,185,535 | B1 * | 2/2001 | Hedin | G10L 15/30 |
| | | | | 704/270 |
| 6,249,720 | B1 * | 6/2001 | Kubota | B60R 16/0232 |
| | | | | 340/990 |
| 6,377,825 | B1 * | 4/2002 | Kennedy et al. | 455/569.2 |
| 6,420,975 | B1 * | 7/2002 | DeLine et al. | 340/815.4 |
| 6,505,057 | B1 * | 1/2003 | Finn et al. | 455/569.2 |
| 7,016,836 | B1 * | 3/2006 | Yoda | 704/233 |
| 7,366,608 | B2 * | 4/2008 | Hamrick | H04W 76/50 |
| | | | | 701/408 |
| 7,542,577 | B2 * | 6/2009 | Kiuchi | 381/96 |
| 7,728,721 | B2 * | 6/2010 | Schofield et al. | 340/438 |
| 7,979,095 | B2 * | 7/2011 | Birmingham | H04M 11/066 |
| | | | | 455/404.1 |
| 8,073,440 | B2 * | 12/2011 | Quimby | H04L 67/16 |
| | | | | 455/41.2 |
| 8,422,693 | B1 * | 4/2013 | Daily et al. | 381/86 |
| 8,648,692 | B2 * | 2/2014 | Himmelstein | 340/5.1 |
| 9,672,816 | B1 * | 6/2017 | Chechik | G10L 13/02 |
| 2002/0013709 | A1 * | 1/2002 | Ortega | G10L 15/22 |
| | | | | 704/260 |
| 2002/0184029 | A1 * | 12/2002 | Brittan et al. | 704/260 |
| 2003/0191648 | A1 * | 10/2003 | Knott | G10L 15/22 |
| | | | | 704/275 |
| 2004/0193420 | A1 * | 9/2004 | Kennewick | G06F 17/30654 |
| | | | | 704/257 |
| 2004/0196179 | A1 * | 10/2004 | Turnbull | 342/357.06 |
| 2005/0058300 | A1 * | 3/2005 | Suzuki | H04R 1/406 |
| | | | | 381/92 |
| 2005/0071159 | A1 * | 3/2005 | Boman et al. | 704/233 |
| 2005/0129224 | A1 * | 6/2005 | Piket | H04M 9/082 |
| | | | | 379/406.01 |
| 2005/0149260 | A1 * | 7/2005 | Bae | G01C 21/26 |
| | | | | 701/533 |
| 2005/0195992 | A1 | 9/2005 | Kiuchi | |
| 2005/0244020 | A1 * | 11/2005 | Nakajima et al. | 381/151 |
| 2005/0267759 | A1 | 12/2005 | Jeschke et al. | |
| 2005/0278083 | A1 * | 12/2005 | Shikano et al. | 701/1 |
| 2006/0181520 | A1 * | 8/2006 | Ikegawa | G06F 3/04886 |
| | | | | 345/173 |
| 2006/0217977 | A1 * | 9/2006 | Gaeta et al. | 704/233 |
| 2007/0003030 | A1 | 1/2007 | Shen et al. | |
| 2007/0050191 | A1 * | 3/2007 | Weider | G06F 17/30864 |
| | | | | 704/275 |
| 2007/0124043 | A1 * | 5/2007 | Ayoub | G06F 21/10 |
| | | | | 701/36 |
| 2007/0150287 | A1 * | 6/2007 | Portele et al. | 704/275 |
| 2008/0004875 | A1 * | 1/2008 | Chengalvarayan et al. | |
| | | | | 704/234 |
| 2008/0147323 | A1 * | 6/2008 | Odinak et al. | 701/211 |
| 2008/0167868 | A1 * | 7/2008 | Kanevsky | G10L 15/20 |
| | | | | 704/233 |
| 2008/0212820 | A1 * | 9/2008 | Park | H04B 1/034 |
| | | | | 381/370 |
| 2009/0005136 | A1 * | 1/2009 | Hutzel et al. | 455/575.9 |
| 2009/0097674 | A1 * | 4/2009 | Watson et al. | 381/86 |
| 2009/0254342 | A1 * | 10/2009 | Buck | G10L 15/222 |
| | | | | 704/233 |
| 2009/0271200 | A1 * | 10/2009 | Mishra et al. | 704/254 |
| 2010/0070932 | A1 * | 3/2010 | Hur | 715/863 |
| 2010/0189275 | A1 * | 7/2010 | Christoph | 381/66 |
| 2010/0286983 | A1 * | 11/2010 | Cho | B60R 16/0373 |
| | | | | 704/246 |
| 2011/0125500 | A1 * | 5/2011 | Talwar et al. | 704/251 |
| 2012/0264395 | A1 * | 10/2012 | Bradburn et al. | 455/404.1 |

FOREIGN PATENT DOCUMENTS

| | | |
|---|---|---|
| JP | H04329740 A | 11/1992 |
| JP | H0635497 A | 2/1994 |
| JP | H0653767 A | 2/1994 |
| JP | H0816190 A | 1/1996 |
| JP | H08331696 A | 12/1996 |
| JP | 2001-343996 A | 12/2001 |
| JP | 2002-221987 A | 8/2002 |
| JP | 2005-252904 A | 9/2005 |
| JP | 2006-171077 A | 6/2006 |
| JP | 2006-171152 A | 6/2006 |
| JP | 2006-184103 A | 7/2006 |
| JP | 2006195411 | 7/2006 |
| JP | 200870877 | 3/2008 |
| KR | 10-2005-0077806 A | 8/2005 |

OTHER PUBLICATIONS

Chinese Office Action dated Nov. 22, 2013; Appln. No. 201180025828.7 and Translation.

Search Report & Written Opinion dated Jun. 20, 2011 (Appln. No. PCT/US2011/029896).

South Korean Final Rejection for Korean Application No. 10-2012-7034089; dated Jul. 12, 2018.

European Search Report for Application No. 11712433.9 dated Jun. 10, 2015.

* cited by examiner

METHOD FOR ADJUSTING A VOICE RECOGNITION SYSTEM COMPRISING A SPEAKER AND A MICROPHONE, AND VOICE RECOGNITION SYSTEM

BACKGROUND

The present application relates to a method for adjusting a voice recognition system comprising a speaker and a microphone, and especially to a method for adjusting a voice recognition system in a motor vehicle (in-vehicle voice recognition system). The present invention also relates to a voice recognition system, especially an in-vehicle voice recognition system.

Vehicles include a number of subsystems that may be controlled by a user interface comprising a plurality of tactile input devices such as buttons, touch screens, or selection wheels. During the use of a vehicle, it is of paramount importance that the driver's attention is not distracted from the traffic situation around the vehicle.

It is known that vehicles are equipped with voice recognition systems such that controlling a vehicle control system, such as a heating system and/or an audio system and/or a communication system, can be performed by spoken (voice) commands. For example, it is possible that such in-vehicle control systems comprise communication interfaces or communication modules such that mobile devices can be connected to the vehicle system. Examples of such mobile devices include media players, mobile phones, portable of handheld computers, personal digital assistants, smart phones, navigational devices off-board data storage devices or other handheld/mobile devices.

Such voice recognition systems rely on the detection (or on recording) the spoken (voice) commands and therefore a high signal quality of the detected signals (of the spoken commands) is required in order to properly recognize the spoken commands.

Therefore, the need exists of providing solutions allowing for a higher signal quality of the recorded or detected spoken commands in such a way that the adjustment of the voice recognition system is as easy as possible for a user of the vehicle and the voice recognition system.

SUMMARY

This problem is solved by the present invention. This invention provides a method for adjusting a voice recognition system comprising a speaker and a microphone, the method comprising the steps of:
  memorizing an audio frequency signal,
  playing back the audio frequency signal by means of the speaker,
  generating a detection signal by detecting the audio frequency signal by means of the microphone, and
  adjusting parameters of the voice recognition system dependent on the detection signal.

According to the present invention it is advantageously possible to use the voice recognition system without or with a minimum of training and/or adjustment of the system prior to operatively using the system. This means that, for example, the system plays back a audio frequency signal, e.g. a prompt signal and/or a welcome signal, and that the acoustic effect of playing back this audio frequency signal is detected by the voice recognition system in such a manner that an (automatic) adjustment of the voice recognition system is performed. In the context of the present invention, adjustment of the voice recognition system especially means to adjust certain parameters of the voice recognition system, such as the gain and/or other characteristics of a microphone amplifier and/or such as the gain and/or other characteristics of a speaker amplifier. Typically by or after playing back the audio frequency signal, a user is prompted to provide a reaction, e.g. a voice command. In the context of the present invention, such a voice command is also called a user input signal. The main aim of the voice recognition system is to properly recognize this user input signal for a comparably wide variety of different (voices of) speakers and for a comparably wide variety of operational situations, especially different surrounding (acoustic) noise levels and characteristics.

According to the present invention, it is preferred that the voice recognition system is an in-vehicle voice recognition system and wherein the audio frequency signal is played back within the vehicle and wherein the audio frequency signal is detected within the vehicle. Thereby, it is possible to use the voice recognition system in a vehicle and especially while driving the vehicle. Especially, it is possible according to the present invention that the driver of the vehicle is able to use—by using the voice recognition system—the vehicle control system or other vehicle systems in a less complicated way such that less attentiveness is required for controlling these vehicle systems. Especially, it is possible according to the present invention that the geometric characteristics of the interior of the vehicle (i.e. the vehicle cabin configuration) leading to certain acoustic characteristics are automatically taken into consideration by the voice recognition system.

According to the present invention, it is furthermore preferred that the adjustment of parameters of the voice recognition system includes an adjustment of the gain of an amplifier associated to the microphone and/or an adjustment of the gain of an amplifier associated to the speaker.

Thereby, it is advantageously possible that an adjustment of the voice recognition system can be performed easily and automatically.

The present invention also relates to a voice recognition system comprising a speaker and a microphone, wherein an audio frequency signal is stored in a memory device assigned to the voice recognition system, wherein parameters of the voice recognition system are adjusted dependent on a detection signal generated by means of the microphone, wherein the detection signal corresponds to the audio frequency signal played back by means of the speaker.

Thereby, it is advantageously possible to easily calibrate and adjust the voice recognition system.

According to the present invention, it is preferred that the voice recognition system is an in-vehicle voice recognition system.

According to the present invention, it is also preferred that the in-vehicle voice recognition system is fixedly built in the vehicle by the Original Equipment Manufacturer (OEM).

Especially, is advantageously possible according to the present invention to use the vehicle control system or the plurality of vehicle control systems (possibly with other devices such as mobile devices connected to such a vehicle control or communication system) by means of using the inventive voice recognition system of the vehicle in such a way as to be less distracted from the traffic situation of the vehicle.

The invention will become more fully understood from the following detailed description, taken in conjunction with the accompanying drawings, wherein like reference numerals refer to like elements.

DETAILED DESCRIPTION

Before turning to the figures which illustrate the application in detail, it should be understood that the application is not limited to the details or methodology set forth in the following description or illustrated in the figures. It should also be understood that the phraseology and terminology employed herein is for the purpose of description only and should not be regarded as limiting the scope of the present invention.

Figure 1:
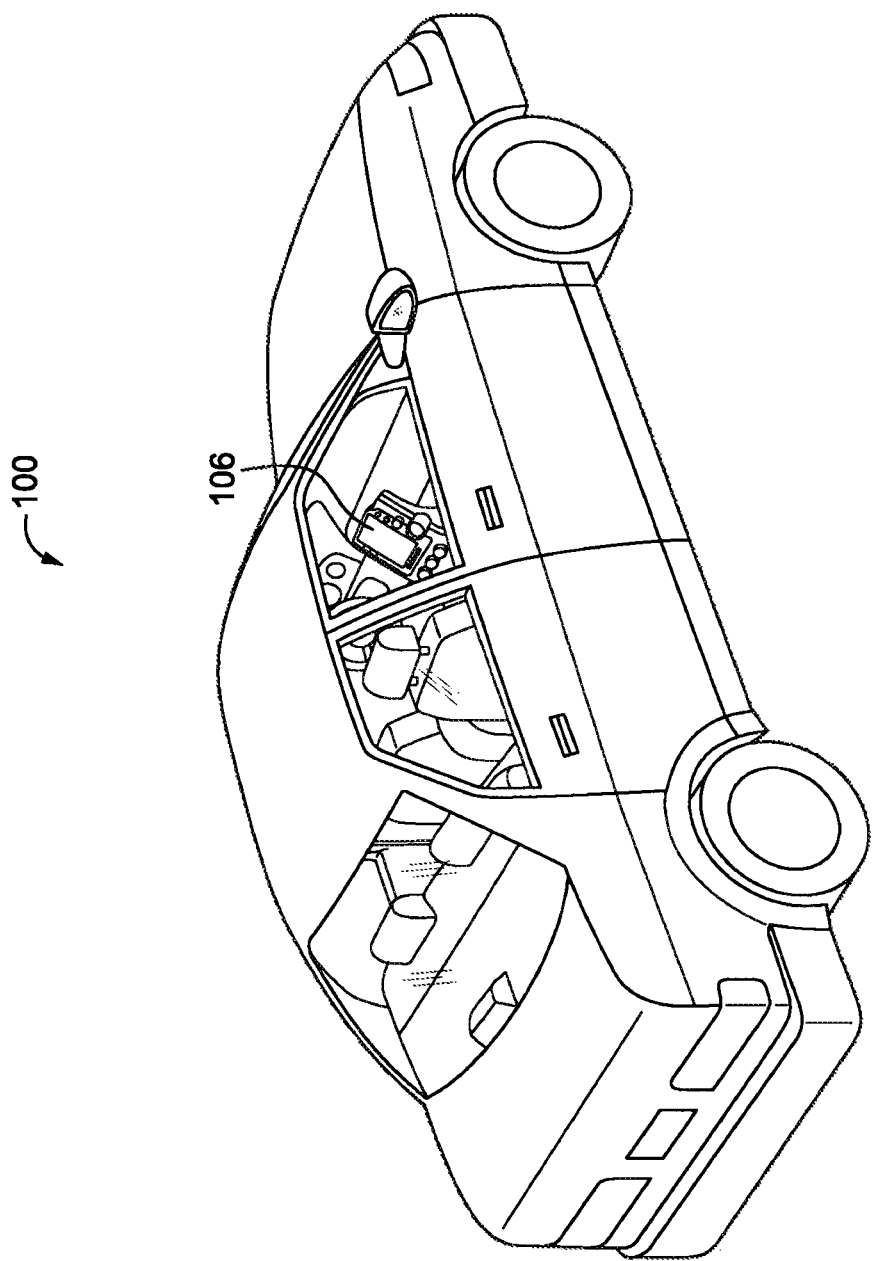
FIG. 1 shows a perspective view of a motor vehicle that includes an in-vehicle voice recognition system.

Referring to FIG. 1, a vehicle 100 includes an in-vehicle voice recognition system 106. The in-vehicle voice recognition system is especially linked to a vehicle control system such as, e.g., a media system, a navigational system, an entertainment system, a display system, or another vehicle control system comprising, for example, a display means or another user interaction means.

Figure 2:
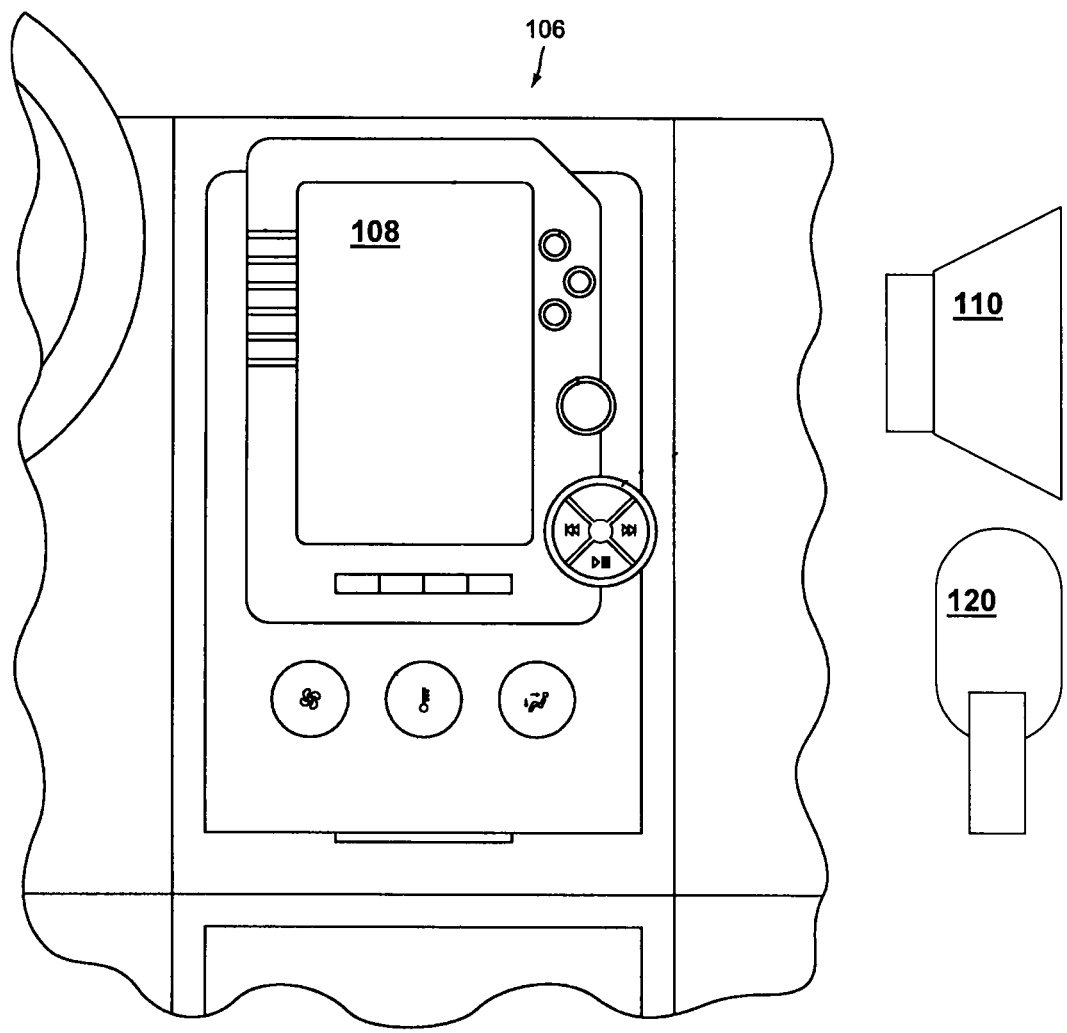
FIG. 2 schematically shows a front view of the in-vehicle voice recognition system.

Referring to FIG. 2, the in-vehicle voice recognition system 106 is shown together with a microphone 120 and a speaker 110. The in-vehicle voice recognition system 106 can include a display means 108 (also called output display), and one or more knobs or input means, and/or one or more pushbuttons or the like. Such input devices can be used for controlling various vehicle functions without the use of voice commands. The speaker 110 and the microphone 120 are only represented schematically; especially, there can be (and preferably are) a plurality of speakers 110 and also there can be (and preferably are) a plurality of microphones 120. Preferably, the speaker 110 (or plurality of speakers 110) and/or the microphone 120 (or plurality of microphones 120) are provided adjustable. This means that, e.g. one or a plurality of amplifiers or other devices or entities influencing the audio characteristics of the speaker(s) 110 and/or microphone(s) 120 are provided such that their behavior can be changed dependent on one or a plurality of parameters.

The amplifier or amplifiers can either be comprised in the microphone or microphones 120 and/or in the speaker or speakers 110 or they can be provided in a control unit assigned to the microphone(s) 120 and/or speaker(s) 110.

An audio frequency signal stored in a memory device inside of the voice recognition system 106 (or assigned to the voice recognition system 106) can be played back by means of the speaker 110 such that the microphone 120 or microphones 120 are able to generate a detection signal. Such a detection signal is fed to the voice recognition system (i.e. to a control unit or micro-controller unit or to another controlling and/or data processing device such as a digital signal processor) in order to be analyzed. If insufficient audio quality is detected, the parameters of the voice recognition system are changed dependent on the detection signal. Especially, it is advantageously possible according to the present invention that a noise reduction can be realized while recognizing the voice command of the user. This is possible due to the fact that the detection signal related to the audio frequency signal is analyzed and a related noise pattern extracted or determined.

From such a noise level pattern, it is advantageously possible according to the present invention to estimate a noise level pattern of the voice command of the user (spoken, e.g., into the microphone or captured by the microphone or the plurality of microphones) to be recognized by the voice recognition system and thereby the performance of the system enhanced.

Figure 3:
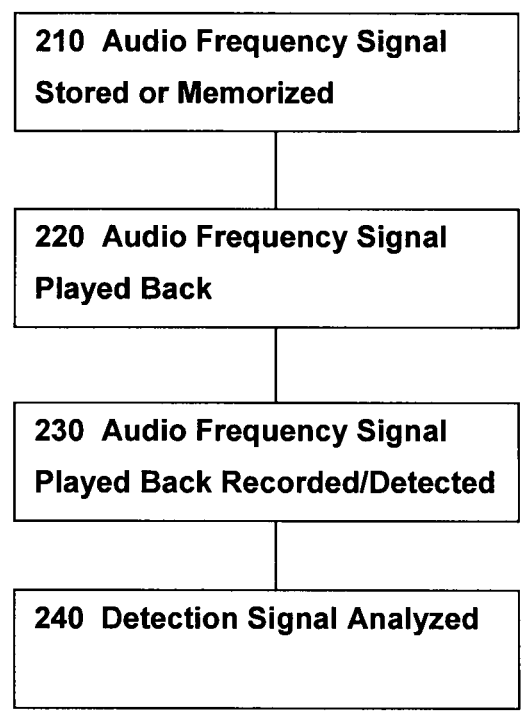
FIG. 3 schematically shows the inventive method for adjusting the inventive voice recognition system.

In FIG. 3 the inventive method for adjusting the inventive voice recognition system is schematically shown. In a first step 210—usually during the manufacture of the voice recognition system or during adaption of the voice recognition system for different markets (having different languages)—the audio frequency signal is stored or memorized in a memory device or memory unit of the voice recognition system or assigned to the voice recognition system.

In a second step 220, the audio frequency signal is played back by means of the speaker 110. This playing back of the audio frequency signal is preferably done during either an initial use of the voice recognition system by a user and/or at a later time during normal use of the voice recognition system. Especially, any prompt output by the speaker 110 or any audible signal output by the speaker 110 can be used by the voice recognition system in order to optimize the parameter settings of the voice recognition system.

In a third step 230, the played back audio frequency signal is recorded or detected using the microphone or microphones 120 and a detection signal is generated to be fed to the to the voice recognition system, especially to a control unit or micro-controller unit or to another controlling and/or data processing device such as a digital signal processor.

By analyzing the detection signal in a fourth step 240, the adjustment of parameters of the voice recognition system can be optimized dependent on the detection signal. Thereby, it is possible according to the present invention to reduce the noise level and thereby to enhance the recognition performance of the voice recognition system. An enhancement of the recognition performance of the voice recognition system can, e.g., be provided by a faster recognition of the voice command of a user and/or by a more accurate recognition.

Although only certain embodiments of the invention have been described herein, it will be understood by any person skilled in the art that other modifications variations and possibilities of the invention are possible without departing from the broader spirit of the invention. Such modifications, variations and possibilities are therefore to be considered as falling within the spirit and scope of the invention and hence forming part of the invention as herein described and/or exemplified. Accordingly, the specification and drawings are to be regarded in an illustrative sense rather than in a restrictive sense.

The invention claimed is:

1. A method for adjusting a voice recognition system to different surrounding acoustic noise levels and voice characteristics, wherein the voice recognition system comprises a speaker and a microphone, the method comprising the steps of:
   a) memorizing an audio frequency signal by the voice recognition system;
      wherein the audio frequency signal comprises any prompt output by the speaker or any audible signal output by the speaker and/or a prompt signal prompting for a user input signal and/or a welcome signal;
      wherein the audio frequency signal is recognized by the voice recognition system;
   b) playing back the audio frequency signal by means of the speaker, wherein after the playing back of the audio frequency signal, a user is prompted to provide the user input signal;

c) detecting an acoustic effect of the playing back of the audio frequency signal by the microphone;
d) generating a detection signal by the microphone based on the detected acoustic effect of the playing back of the audio frequency signal;
e) automatically adjusting parameters of the voice recognition system upon detecting the generated detection signal and prior to the user operatively using the voice recognition system; and
f) receiving the user input signal by the voice recognition system; wherein the user input signal comprises a first voice command;
wherein the steps a) through f) are performed in sequential order;
wherein the adjusting of parameters of the voice recognition system includes an adjustment of a gain of an amplifier associated to the microphone, speaker or both;
wherein the voice recognition system is in a vehicle; and
wherein the step of playing back the audio frequency signal is conducted during an initial use of the voice recognition system once the user enters the vehicle.

2. The method according to claim 1, wherein the audio frequency signal is played back within the vehicle and wherein the audio frequency signal is detected within the vehicle.

3. The method according to claim 1, wherein the adjustment of parameters of the voice recognition system includes an adjustment of the gain of an amplifier associated to the microphone.

4. The method according to claim 1, wherein the adjustment of parameters of the voice recognition system includes an adjustment of the gain of an amplifier associated to the speaker.

5. A voice recognition system comprising:
a memory device assigned to the voice recognition system, wherein the memory device is configured to store an audio frequency signal;
wherein the audio frequency signal comprises any prompt output by a speaker or any audible signal output by the speaker and/or a prompt signal prompting for a user input signal and/or a welcome signal;
means for recognizing the audio frequency signal;
the speaker configured to play back the audio frequency signal and further configured to prompt a user to provide the user input signal after the playing back of the audio frequency signal;
a microphone configured to detect an acoustic effect of the playing back of the audio frequency signal, wherein the microphone is further configured to generate a detection signal based on the detected acoustic effect of the playing back of the audio frequency signal;
means for automatically adjusting parameters of the voice recognition system upon detecting the generated detection signal and prior to the user operatively using the voice recognition system to adjust the voice recognition system to different surrounding acoustic noise levels and voice characteristics, wherein the means for automatically adjusting parameters of the voice recognition system includes an adjustment of a gain of an amplifier associated to the microphone, speaker, or both; and
wherein the microphone is further configured to receive the user input signal after the adjustment of the voice recognition system to the different surrounding acoustic noise levels and voice characteristics, wherein the user input signal comprises a first voice command;
wherein the voice recognition system is an in-vehicle voice recognition system; and
wherein the playing back the audio frequency signal is conducted during an initial use of the voice recognition system once the user enters the vehicle.

6. The voice recognition system according to claim 5, wherein the audio frequency signal is played back within the vehicle and wherein the audio frequency signal is detected within the vehicle.

7. The voice recognition system according to claim 5, wherein the in-vehicle voice recognition system is fixedly built in the vehicle.

8. The voice recognition system according to claim 5, wherein the in-vehicle voice recognition system is fixedly built in the vehicle by the Original Equipment Manufacturer (OEM).

9. The method according to claim 1, wherein the step of memorizing the audio frequency signal is conducted during manufacture of the voice recognition system.

10. The method according to claim 1, wherein the step of memorizing the frequency signal is conducted during adaptation of the voice recognition system for different languages.

11. The method according to claim 1, wherein the audio frequency signal is preinstalled.

12. The method according to claim 1, wherein the method further comprises a step of memorizing the user input signal by the voice recognition system, and wherein the step of memorizing the user input signal is conducted during adaptation of the voice recognition system for different languages.

13. The method according to claim 1, wherein geometric characteristics of a vehicle interior leading to certain acoustic characteristics are automatically taken into consideration by the voice recognition system.

14. The method according to claim 13, wherein the method further comprises the step of recognizing the user input signal by the voice recognition system, wherein the user input signal includes a plurality of different voices and a plurality of different surrounding acoustic noise levels and characteristics.

15. The method according to claim 1, wherein after the step of generating the detection signal, the method further comprises the steps of analyzing the detection signal and determining a noise level pattern; and estimating a noise level pattern of the user input signal.

16. A method for adjusting a voice recognition system to different surrounding acoustic noise levels and voice characteristics, wherein the voice recognition system comprises a speaker and a microphone, the method comprising the steps of:
a) memorizing an audio frequency signal by the voice recognition system;
wherein the audio frequency signal comprises any prompt output by the speaker or any audible signal output by the speaker and/or a prompt signal prompting for a user input signal and/or a welcome signal;
wherein the audio frequency signal is recognized by the voice recognition system;
b) playing back the audio frequency signal by the speaker, wherein after the playing back of the audio frequency signal, a user is prompted to provide the user input signal;
c) detecting an acoustic effect of the playing back of the audio frequency signal by the microphone;

d) generating a detection signal by the microphone based on the detected acoustic effect of the playing back of the audio frequency signal; and e) automatically adjusting parameters of the voice recognition system upon detecting the generated detection signal and prior to the user operatively using the voice recognition system, wherein the adjustment of parameters of the voice recognition system includes an adjustment of the gain of an amplifier associated to the microphone, speaker or both;

wherein the voice recognition system is in a vehicle; and wherein the step of playing back the audio frequency signal is conducted during an initial use of the voice recognition system once the user enters the vehicle.

17. The method of claim 16, the method further comprises a step of f) receiving the user input signal by the voice recognition system, wherein the user input signal comprises a first voice command.

18. The method according to claim 16, wherein after the step of generating the detection signal, the method further comprises the steps of analyzing the detection signal and determining a noise level pattern; and estimating a noise level pattern of the user input signal.

19. The method according to claim 16, wherein the audio frequency signal is played back within the vehicle and wherein the audio frequency signal is detected within the vehicle.

* * * * *

UNITED STATES PATENT AND TRADEMARK OFFICE
CERTIFICATE OF CORRECTION

PATENT NO. : 10,115,392 B2
APPLICATION NO. : 12/793113
DATED : October 30, 2018
INVENTOR(S) : Michael J. Sims et al.

It is certified that error appears in the above-identified patent and that said Letters Patent is hereby corrected as shown below:

In the Claims

Column 6, Line 22 Claim 10:
Insert --audio-- before --frequency signal--

Signed and Sealed this
Eighth Day of January, 2019

Andrei Iancu
*Director of the United States Patent and Trademark Office*